United States Patent Office 2,948,747
Patented Aug. 9, 1960

2,948,747

PROCESS OF PREPARING METALLO DERIVATIVES OF ACETOACETIC ACID ESTERS

August C. Karbum and James C. Boag, Detroit, Mich., assignors to Ethyl Corporation, New York, N.Y., a corporation of Delaware No Drawing. Filed Dec. 1, 1954, Ser. No. 472,530

6 Claims. (Cl. 260—483)

This invention relates to an improved process for the preparation of liquid, metal organic material.

The liquid, organic material, the preparation of which is the focal point of this invention, is eminently suited for additive use. For example, being in the liquid state at ordinary temperatures, it can be readily blended with gasoline, diesel fuel, lubricating oil, and the like. The art appreciates the advantages gained by the incorporation of various metal organic compounds in such media.

Heretofore, the liquid, metal organic material above mentioned was prepared by heating solid, salt-like metallic chelates of esters of acetoacetic acid to a temperature at which there was a drastic color change accompanied by an unexplainable conversion to material which remains in the liquid state even at ordinary temperatures. This conversion usually is not rapid and, therefore, the temperature of the transformation had to be maintained for a sufficient time for complete conversion to occur. While this process is operative and yields novel and important products, it is not without disadvantages. It is a lengthy and costly operation. For example, metallic chelates of esters of acetoacetic acid are fine chemicals and are not readily available as articles of commerce. To prepare such metallic chelate salts, several methods are available, the most practical of which is reaction between a metallic salt and an ester of acetoacetic acid in an aqueous or alcoholic medium. Thus, the metallic chelate salt formed ordinarily contains water or alcohol of crystallization. When such chelate salts are subjected to the thermal process known heretofore, the removal of this water or alcohol of crystallization not only consumes heat energy, but extends the time of heating required for the conversion to the liquid form to occur. Consequently, the prior process for the preparation of the liquid, metal organic material above mentioned is not readily adaptable to large scale operation because of the many steps involved requiring use of expensive equipment. Moreover, the prior process involves handling of large amounts of solid metallic chelates of esters of acetoacetic acid which results in the particular difficulty of non-uniform heating throughout the mass. Thermal decomposition of at least a portion of this mass is frequently encountered.

It is an object of this invention to provide an improved process for the preparation of liquid, metal organic material. Another object is to provide a process for the preparation of liquid, metal organic material which is adaptable to large scale operations. The provision of a continuous process for the preparation of liquid, metal organic material is still another object of this invention. Other objects will become apparent from the ensuing description.

The above and other objects of this invention are accomplished by a process of preparing liquid, metal organic material which comprises heating a mixture of (1) an ester of acetoacetic acid and (2) an ionic compound of a metal, said metal being normally capable of forming a compound possessing a chelate structure with said ester, to a temperature sufficient to form said material which remains in the liquid state at ordinary temperatures (20–30° C.), that is, after cooling to room temperature. The temperature of this heating must be insufficient to cause thermal decomposition of the liquid, metal organic material formed. In general, this temperature is above 100° C. and less than 250° C. In most cases, temperatures in the range of from 140° C. to 180° C. bring about the desired reaction.

The duration of the heating is dependent upon both the temperature employed and the nature of the metal salt and particular acetoacetic ester used. Also, the time required to some extent varies inversely with the temperatures used, but is generally not more than three hours.

The conversion or transformation brought about in our process is evidenced by a definite color change which usually is a darkening in color. This color change can be readily distinguished from thermal decomposition which has the normal appearance of charring. The nature of this transformation is not known, but it has been found that once it occurs, the resulting metallic organic material remains in the liquid state at ordinary temperatures and that no solid chemical compound can be crystallized or otherwise separated therefrom. Experiments have shown that at the temperature of the conversion, no material is gained or lost.

The process of our invention appears applicable only to esters of acetoacetic acid. For example, while certain salts can be heated with chelating agents classed as β-diketones such as acetylacetonate, the reaction product formed involves a crystallizable solid product. Attempts to use higher temperatures result in thermal decomposition.

The esters of acetoacetic acid used as reactants in our process have the general formula

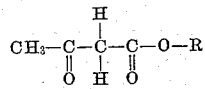

wherein R is a hydrocarbon radical containing from 1 to about 12 carbon atoms. Liquid, aliphatic esters of acetoacetic acid, particularly alkyl esters, are preferred since they enter into the process of this invention with especial ease yielding stable and useful liquid, organic material. Typical acetoacetic esters used in our process include methyl acetoacetate; ethyl acetoacetate; propyl acetoacetate; isopropyl acetoacetate; n-, iso-, sec.-, or t-butyl acetoacetate; and likewise the various pentyl, hexyl, heptyl, octyl, nonyl, decyl, undecyl, and dodecyl acetoacetates. Other hydrocarbon substituted esters of acetoacetic acid which may be used include cyclohexyl acetoacetate; benzyl acetoacetate; and the like.

The other prime reactant according to our process is an ionic compound of a metal, the metal thereof being normally capable of forming chelates with esters of acetoacetic acid. Such normal chelates are generally believed to be complex coordination compounds in which a coordinate linkage is established between the metal salt of the enol form of the acetoacetic ester and the oxygen atom of the remaining carbonyl group, the metal atom thereby becoming part of one or more six-membered rings. The number of such rings is dependent on the valence state of the metal entering into metal chelate formation. Thus, we use ionic compounds of such metals as lithium, sodium, potassium, copper, magnesium, calcium, strontium, barium, zinc, cadmium, mercury, aluminum, thallium, lead, vanadium, chromium, molybdenum, iron, nickel, cobalt, and the like.

While any ionic compound of a metal which normally forms such chelates may be employed in our process, we prefer those ionic compounds which produce a volatile secondary product when heated with an ester of acetoacetic acid. Thus, metal halides, hydroxides, acetates, nitrates, oxalates, amides, sulfides, and the like are most suitable as a metal source for our process. Our process is still further facilitated by the use of reduced pressure when employing ionic compounds of metals which produce a volatile secondary product at the temperature of the reaction. In this manner, the volatile product is conveniently removed from the reaction zone and the reaction rate increased.

The reactants of the process of this invention are mixed in amount such that there is at least the stoichiometric amount of acetoacetic ester normally required to react with the metal in question to form a conventional metallic chelate. For example, if a liquid, metal organic compound of aluminum is being prepared with ethyl acetoacetate, at least 3 moles of the ester should be present per mole of an ionic compound of aluminum. In the cases of calcium and sodium, the acetoacetic ester is present in at least 2:1 and 1:1 molar ratios based on the respective ionic compounds. The proportions are thus determined by the valence of the metal to be incorporated in the liquid, metal organic material being prepared. Excess acetoacetic ester can be used, in which case it is believed that the same chemical material is formed and is dissolved in the excess ester. Should a deficiency of ester be used, the reaction proceeds to the point at which the ester is used up, leaving some metallic ionic compound unreacted.

The invention is further illustrated by the following examples in which all parts and percentages are by weight.

*Example I*

Approximately 96 parts of vanadium tetrachloride and 429 parts of octylacetoacetate were heated together in a glass flask at a temperature of 122° C. The thermal treatment continued over a period of 3 hours during which time the temperature was gradually increased to about 146° C. As the heating continued, copious quantities of HCl were given off and the reaction was considered complete when the evolution of HCl ceased. The resultant dark green liquid was filtered but yielded no precipitate. The liquid product when cooled to room temperature remained as a dark green oil containing 5.98 percent of vanadium.

*Example II*

Approximately 47 parts of sodium hydroxide and 240 parts of octylacetoacetate were heated together in a glass vessel. At 100° C., the reaction proceeded rapidly and exothermally to a final temperature of 140° C. Upon cooling to room temperature, a dark brown, clear liquid containing 6.46 percent of sodium was obtained.

*Example III*

Approximately 100 parts of anhydrous aluminum chloride were gradually added to about 161 parts of octylacetoacetate over a period of time and at a temperature between 110° C. to 120° C. The reaction was permitted to proceed under reflux conditions and with the concurrent evolution of hydrogen chloride. As the rate of hydrogen chloride gas evolution markedly decreased, the temperature was quickly raised to 200° C., for a period of 20 minutes and the reaction mixture was then permitted to slowly cool to room temperature. The product was 451 parts of a reddish brown oil containing 4.40 percent of aluminum.

*Example IV*

Approximately 2 parts of cupric acetate were mixed with about 2 parts of octylacetoacetate and a few drops of triethylamine and the mixture was then heated at 165° C., for 20 minutes. The resultant product was a copper-containing dark green liquid soluble in hydrocarbon solvents.

*Example V*

Approximately 25 parts of nickel acetate tetrahydrate and 53 parts of octylacetoacetate were heated together in a glass flask at a temperature of about 170° C. The reaction proceeded rapidly and when the evolution of acetic acid vapors ceased, the reaction mixture was permitted to cool to room temperature to yield a nickel-containing green colored liquid.

*Example VI*

Approximately 25 parts of calcium acetate monohydrate were mixed with 60 parts of octyl acetoacetate and the resultant mixture was heated in a stainless steel beaker to a temperature of 160° C., for 45 minutes to yield a calcium containing orange-red liquid which did not solidify upon cooling to room temperature.

*Example VII*

Approximately 31 parts of chromous chloride and 107 parts of octylacetoacetate were heated together, while stirring, at a temperature of about 168° C., and at a reduced pressure of about 1 millimeter of mercury. The evolution of hydrogen chloride was gradual but steady. After 3 hours of this thermal treatment, the reaction mixture was cooled to room temperature to yield a stable, dark green, viscous liquid soluble in hydrocarbon solvents. An analysis of the product showed that it contained 7.13 percent chromium.

*Example VIII*

Approximately 26 parts of ethyl acetoacetate, 26 parts of n-octyl alcohol, 22 parts of magnesium acetate tetrahydrate and 20 parts of triethylamine were mixed together and then heated at a temperature of 200° C., for 30 minutes. Upon cooling to room temperature, a dark reddish brown liquid was obtained. An analysis of the oil indicated that it contained 4.90 percent of magnesium.

*Example IX*

Approximately 2 parts of ferric chloride were mixed with about 7 parts of octylacetoacetate and the mixture was then heated at a temperature of about 130° C., until hydrogen chloride was no longer evolved. The temperature was then raised to 180° C., for 10 minutes and the reaction mixture was permitted to slowly cool to room temperature. The product obtained was a dark brown, iron-containing liquid which was soluble in the usual hydrocarbon solvents.

The process of this invention is readily adapted to continuous operation. In some instances where the liquid, metal organic material to be prepared is thermally unstable, a continuous flow process is the only feasible means for its preparation. Thus, we provide a continuous process of preparing liquid, metal organic material which comprises concurrently introducing an ester of acetoacetic acid and an ionic compound of a metal, said metal being normally capable of forming a compound possessing a chelate structure with said ester, into a reaction zone maintained at a temperature sufficient to form said material which remains in the liquid state at ordinary temperatures, and removing the material as formed from the reaction zone. The reactants can be premixed or introduced into the reaction zone separately but concurrently.

In our continuous process, the residence time can be regulated by the rates of introduction of reactants and removal of product. Of the variations possible in conducting our continuous process the use of a temperature gradient throughout the reaction zone is frequently advantageous. For example, by steadily increasing the temperature of the reactants as they pass through the reactor, the reaction proceeds readily on reaching reaction temperature. This enables the product to be withdrawn from the reaction zone before there has been an opportunity for thermal decomposition.

The following example exemplifies a preferred form of a continuous flow process of preparing a liquid, metal organic material which is thermally unstable.

Example X

Approximately 112 parts of potassium hydroxide and 429 parts of octylacetoacetate were mixed together in a reactor maintained at a temperature between 80° C., to 110° C., and the resultant product was then fed into an apparatus consisting of a tube leading from a feed reservoir through an oil bath held constantly at a temperature between 215° C., and 220° C. A thermometer or other temperature measuring means is placed in the tube, in a well, just outside of the bath on the outlet side and so arranged that only the temperature of the flowing liquid was measured. The feed from the reservoir was adjusted so that the effluent liquid may just reach the necessary temperature to complete the reaction between the reactants and also provide a residence time brief enough to prevent decomposition of the metallic chelate derivative. In the example described here, the reaction product was fed at a rate which provided a 30 to 45 second residence time at a temperature of 160° C., to yield a reddish brown oil analyzing 10.58 percent of potassium.

The reaction described herein can be carried out in any suitable reaction vessel such as glass, iron, steel, stainless steel, silver, platinum, Monel metal, copper and other metals and alloys which are capable of withstanding heat and pressure. In the batch process, the reaction can be carried out with agitation, although agitation is not always necessary.

The products obtained by the practice of this invention are useful in compounding antiknock fluids, volatile fuel compositions, non-volatile fuel compositions, lubricant compositions and the like. The utility, at least in part, results from the unique solubility and inductibility characteristics of the products prepared by our invention. Thus, many of these products can be effectively utilized in bunker oils and in furnace oils to partake of the properties of some of the metals in improving the combustion characteristics of such materials.

Additional uses of the products of this invention include their use as chemical intermediates, particularly in the preparation of agricultural chemicals and polymeric substances containing metals and metalloids; as materials for the prepartion of catalyst compositions for use in oxidation, reduction and cracking operations, as chemical intermediates in the preparation of medicinals thereby utilizing the well-known therapeutic value of some of the metallic components; and as constituents of jet and rocket fuels. This application is a continuation-in-part of application Serial No. 377,728, filed August 31, 1953, and now abandoned.

We claim:

1. A process of preparing liquid, metal organic material which comprises the steps of forming a mixture of a liquid, aliphatic ester of acetoacetic acid and in an ionic compound of a metal that reacts with said ester to form a chelate of the metal, and heating this mixture to a temperature of about 100° C. and less than 250° C. for a time sufficient to cause the above reaction and to form a product in which the metal is chemically bound but which remains liquid at ordinary temperatures.

2. Process of claim 1 further characterized in that said ester of acetoacetic acid is an alkyl ester containing from 1 to 12 carbon atoms in the alkyl group.

3. A process of preparing liquid, metal organic material which comprises the steps of forming a mixture of a liquid alkyl ester of acetoacetic acid in which said alkyl group contains from 1 to 12 carbon atoms and an ionic compound of a metal that reacts with said ester to form a chelate of the metal, said ionic compound being capable of producing a volatile secondary product when heated with said ester, and heating this mixture to a temperature of above 100° C. and less than 250° C. for a time sufficient to (a) cause the above reaction, (b) form said volatile secondary product, and (c) form a product in which the metal is chemically bound but which remains liquid at ordinary temperatures.

4. A continuous process of preparing liquid, metal organic material which comprises the steps of concurrently introducing into a reaction zone a liquid, aliphatic ester of acetoacetic acid and an ionic compound of a metal that reacts with said ester to form a chelate of the metal, heating the reaction zone to a temperature of above 100° C. and less than 250° C., and providing a residence period within said zone sufficient to cause the above reaction and to form a product in which the metal is chemically bound but which remains liquid at ordinary temperatures, and removing said product as formed from said reaction zone.

5. The process of claim 1 further characterized in that said ester of acetoacetic acid is an alkyl ester containing from 1 to 12 carbon atoms in the alkyl group and said metal is calcium.

6. The process of claim 1 further characterized in that said ester of acetoacetic acid is an alkyl ester containing from 1 to 12 carbon atoms in the alkyl group and said metal is magnesium.

References Cited in the file of this patent

UNITED STATES PATENTS

| | | |
|---|---|---|
| 2,149,856 | McKone et al. | Mar. 7, 1939 |
| 2,307,075 | Quattlebaum et al. | June 5, 1943 |

OTHER REFERENCES

Morgan et al.: Jour. Chem. Soc., vol. 103, pages 78–90 (1913).

Morgan et al.: Jour. Chem. Soc., vol. 105 (Trans), pages 189–201 (1914).

Hackman: J.C.S., pt. III, pages 2505–6 (1951).

Dwyer et al.: Jour. Amer. Chem. Soc., vol. 75, pages 984–985, Feb. 20, 1953.